United States Patent [19]
Karklys

[11] 3,790,815
[45] Feb. 5, 1974

[54] ELECTRONIC CONTROL CIRCUIT FOR APPLIANCES

[75] Inventor: Joseph Karklys, St. Joseph, Mich.

[73] Assignee: Whirlpool Corporation, Benton Harbor, Mich.

[22] Filed: Apr. 4, 1972

[21] Appl. No.: 240,966

Related U.S. Application Data

[62] Division of Ser. No. 837,163, June 27, 1969, Pat. No. 3,662,186.

[52] U.S. Cl. ............... 307/141, 134/57 D, 137/287, 259/1 R, 340/309.4
[51] Int. Cl. ............................................. H01h 43/00
[58] Field of Search ........ 134/57 D, 58 D; 307/141; 257/1 R; 68/12 R; 137/287; 34/45; 340/309.4

[56] References Cited
UNITED STATES PATENTS
3,539,153  11/1970  Wennerberg ................. 307/141 X
3,464,673  9/1969   Cargo et al. .................. 307/141 X
2,391,718  12/1945  Lindemann ...................... 68/12 R
3,639,844  2/1972   Karklys ....................... 134/57 D X Primary Examiner—Robert K. Schaefer
Assistant Examiner—William J. Smith
Attorney, Agent, or Firm—Hofgren, Wegner, Allen, Stellman & McCord

[57] ABSTRACT

A control for a multiple function apparatus, such as an appliance, utilizing an electronic clock, or timer, electronic program circuitry and digital circuitry to select and control the functions to be performed. The electronic program circuitry has a plurality of bistable circuits, one portion controlling a series of steps repeated in each of several subcycles and the other portion controlling the sequence of subcycles. The second portion may be preset to establish a desired operating program. The digital circuitry is responsive to the condition of the bistable program circuits and to the clock to control the operation of the appliance.

11 Claims, 7 Drawing Figures

PATENTED FEB 5 1974　　　　　　　　　　　　　　　3,790,815

ELECTRONIC CONTROL CIRCUIT FOR APPLIANCES

This is a division of application Ser. No. 837,163 filed June 27, 1969, now U.S. Pat. No. 3,662,186, May 9, 1972.

BACKGROUND OF THE INVENTION

1. Field of the Invention

This invention is concerned with electrical controls.

2. Description of the Prior Art

Multiple function home appliances, such as dishwashers, washing machines, clothes dryers, combination washer-dryer and the like, are commonly controlled by a series of switches operated by a motor driven cam. In some cases, several different programs of operation are provided and each is on one sector of the cam. A mechanical stop mechanism provides for positioning the cam at the appropriate starting point for a desired cycle of operation. Such controls have been relatively expensive to manufacture, have rather critical mechanical tolerances, are often a source of service and maintenance problems, and are relatively limited as to the number of programs and cycles that may be selected by the user of the appliance.

SUMMARY OF THE INVENTION

The present invention is concerned with an electronic control utilizing digital techniques for performing the sequential and selective control functions in a multiple function home appliance or other similar apparatus to overcome the limitations of prior art appliance controls. Many components of the control of this invention may utilize solid state circuitry and may be fabricated with integrated circuit techniques as, for example, an integrated circuit utilizing metal oxide semiconductors.

This invention comprehends the provision of an electronic control which includes a source of timing signals for use in an apparatus such as an appliance, together with a program circuit means having a plurality of sequential stable states representing the functions of the apparatus. The control includes a means for sensing conditions in the apparatus, and a gate circuit means responsive to the program circuit means, the timing signals and the means for sensing apparatus conditions for generating signals to initiate and terminate the sequential functions of the apparatus. A means responsive to termination of each function actuates the program circuit means seriatim from one stable state to the next.

More particularly, the operating cycle for the apparatus may include subcycles each having one or more functions, the control including means establishing a sequence of subcycles, means responsive to timing signals and the subcycle sequence for establishing the length of each subcycle, and means responsive to the termination of a subcycle for selecting the next subcycle.

The means for establishing a sequence of subcycles in the illustrated control includes a plurality of interconnected bistable circuits, each having two operating states. Means connected with the bistable circuits and responsive to the condition thereof determine the subcycle to be performed. Further means are operative at the end of each subcycle, changing the setting of the bistable circuits to establish a desired sequence of subcycles.

The invention further comprehends such a control having means by which the bistable circuits may selectively be preset to establish the cycle of operations of the appliance.

Further the control may include means responsive to a condition of the appliance for repeating a subcycle under certain preselected conditions, as, for example, in repeating a rinsing operation when the rinse water is not sufficiently clean. The bistable circuits which establish the sequence of subcycles of the control may have one portion which controls a series of steps repeated in each of a plurality of subcycles and another portion which controls the sequence of subcycles. The first portion of the bistable circuits may operate in several of the subcycles and be reset at the end of each subcycle.

Another feature of the invention is the provision of control means enabling the user of the appliance to select from a much larger number of program and cycle options than is available employing prior art control means.

BRIEF DESCRIPTION OF THE DRAWING

Further features and advantages of the invention will readily be apparent from the following specification taken in connection with the drawing, in which:

FIG. 4 is a detailed block diagram illustrating the invention;

DESCRIPTION OF THE PREFERRED EMBODIMENT

The invention is illustrated and described herein as embodied in an appliance control, and more specifically, as a control for a dishwasher. The dishwasher shown has an operating cycle including prerinse, first and second washes, first and second post-wash rinses and dry subcycles. As will be obvious to those skilled in the art, the invention is also applicable to dishwashers having less sophisticated operating cycles and to other apparatus, such as home appliances, having multiple functions. For example, the invention may readily be utilized in the control of an automatic washing machine, a clothes dryer, or a combination washer-dryer.

Figure 1:
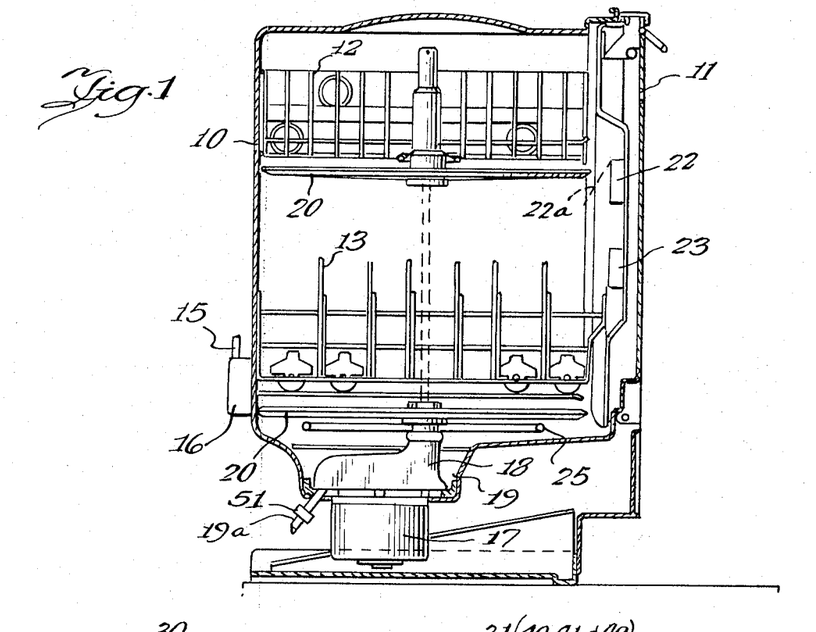
FIG. 1 is a vertical section through an automatic dishwasher utilizing a control incorporating the invention.

Turning now to FIG. 1, the dishwasher appliance shown therein has a housing 10 with an access opening closed by a door 11. Certain portions of the control incorporating the invention may advantageously be mounted in an upper portion of the door 11. Racks 12 and 13 hold the dishes and utensils to be washed.

Water is introduced from a suitable source through conduit 15 and water control valve 16 into the washer housing 10 which provides a receptacle therefor. During the rinse and wash subcycles, a motor 17, mounted below housing 10, operates a pump 18 to circulate the water from sump 19 through spray arms 20. During the drain step at the end of each rinse and wash subcycle, motor 17 may be operated, for example, in the reverse direction, to drive a drain impeller, not shown, to pump the water out through a drain line 19a.

Mounted on the inside of door 11 are a pair of dispensers 22 and 23 having covers, as 22a, released or opened at appropriate times in the operating cycle to release a detergent powder or washing agent to aid in the washing operation. An electric heating element 25 keeps the water hot during rinse and wash subcycles and provides heat for the dry subcycle.

Further details of the physical construction of the dishwasher need not be discussed here for an understanding of the control and its operation. Suitable apparatus may be found in U.S. Pat. Nos. 3,180,348 and 3,262,604, for example.

Figure 2:
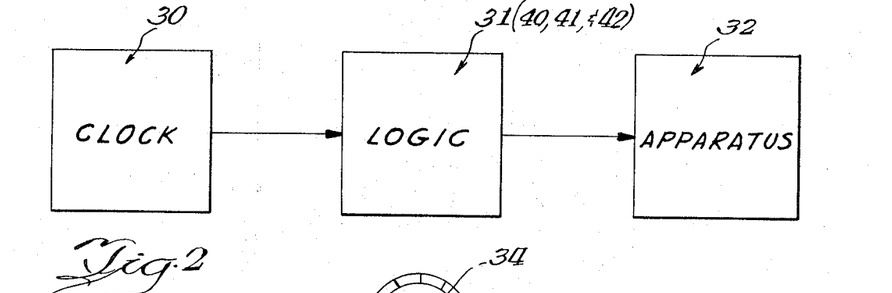
FIG. 2 is a basic block diagram of an apparatus control incorporating the invention.
Figure 3:
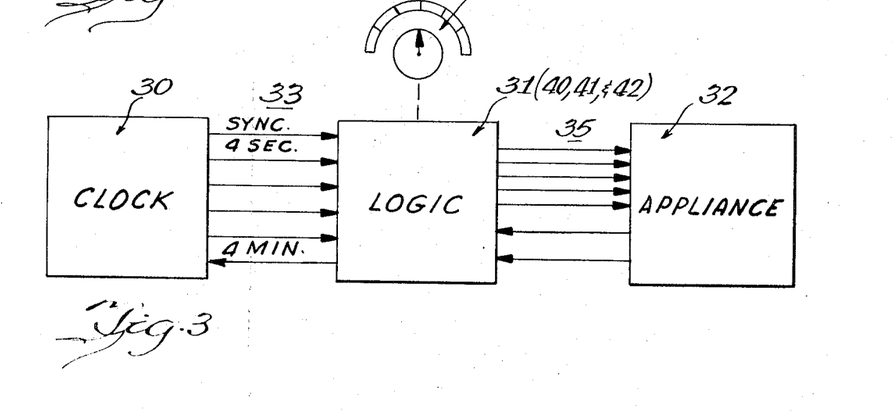
FIG. 3 is a further block diagram illustrating relationships between the elements of the diagram of FIG. 2.

Turning now to FIGS. 2 and 3, the control utilizes a clock, or timer, 30 which operates together with a logic circuit 31 to actuate the functional elements of the apparatus 32 in the desired sequence. The timer 30 may have plural output signals in increments suitable for the operating cycle of the apparatus ranging in FIG. 3 from 4 seconds to 4 minutes. The logic network 31 (discussed below) includes program circuit means which establish the sequence of apparatus functions and gate circuit means which correlate each step of the operating cycle with the appropriate time period to control the operation of the appliance. Suitable time increments may be utilized as indicated by the arrows 33 between the timer and logic network. The operation of the appliance may be modified manually as by presetting the program circuit means of logic network 31 through a manual control input device indicated at 34. The output of logic network 31 controls the various functions of appliance 32 as indicated by arrows 35 (FIG. 3). In turn, conditions of the appliance modify or control the logic network to achieve the desired operation. Thus, the built-in program of the logic network may be modified or supplemented manually in accordance with the wishes of the operator, and automatically depending on the conditions encountered during an operating cycle.

In FIG. 4, an illustrative embodiment of a logic circuit is shown in detail and its interconnections with the clock 30 and with the appliance 32 are indicated. The logic circuit illustrated is made up of several different types of elements. These are a J-K flip-flop, shown as a rectangle; a "NAND" gate, illustrated as a half oval with a circle at the output; and "OR" gate shown as a convex half oval; and an inverter, shown as a triangle with a circle at the input. Each active element is designated by the letter Z with a number and, in some cases, a letter suffix.

The clock 30, not shown in detail in FIG. 4, may be of any suitable type which has outputs including synchronizing or timing pulses, and further pulses indicating desired discrete timing intervals, here shown as ranging from four seconds to four minutes. A suitable clock circuit has a series of frequency dividers operating from the 60 $H_z$ line frequency. In my copending application, Ser. No. 837,179 filed June 27, 1969, now U.S. Pat. No. 3,639,844, Feb. 1, 1972, and assigned to the assignee of this application, there is shown in detail an electronic clock or timer including a plurality of flip-flop stages for generating timing signals which may be utilized in the control of this invention. This clock or timer has the capability of generating high accuracy clock timing periods without any adverse temperature variation effects such as are inherent with known RC timing circuits wherein exposure of the components to varying ambient temperature conditions will, of necessity, introduce errors in the generated timing periods. Thus, the clock or timer utilized in the control of the present invention has the ability to operate over a relatively wide temperature range such as may be found in a dishwasher or clothes dryer, for example, while providing the desired accuracy of the timing periods.

The clock or timer utilized in the control of the present invention provides desired timing periods of great accuracy in multiples of 8.3 milliseconds, based on 60 $H_z$ line frequency power supply to the control.

The control circuitry or logic indicated by block 31 in FIGS. 2 and 3 has several portions shown separately in FIG. 4. A first portion 40 is a program circuit means or sequence control for establishing the sequence of steps in the operating cycle of the appliance. A second portion 41 includes function timing gate circuits responsive to the particular step of the cycle which is being performed and to a timing signal from the clock to establish the length of each step. The switches SW1 through SW5 which make up the manual control 34 provide for modifying the sequence of steps in the operating cycle. The remainder of the gate circuits 42 of FIG. 4 respond to the condition of the program circuit means 40, determining the particular operation to be performed and actuating the appropriate power circuitry 43. Many of the interconnections between elements are indicated by input and output designations rather than with interconnecting lines, in accordance with common practice.

Program circuit means 40 comprises a memory including five bistable circuits Z1 through Z5, each of which is preferably a J-K flip-flop circuit with input and output terminals and signals as indicated on the block of Z1. The J, K input signals received by program circuit means 40 are gated by synchronizing pulses applied to the clock input CL. Additional inputs $P_J$ and $P_K$ do not require synchronization. The outputs 1, 0 provided by Z1 represent conditions indicated elsewhere in the diagram as Z1, Z1, respectively. When the flip-flop is reset, Z1 is 0 and Z1 is 1; when it is set, Z1 is 1 and Z1 is 0. The other bistable circuits have corresponding outputs. A resistor 40a is connected from ground to the $P_K$ inputs of circuits Z1 through Z5 to supply logic 0 to these circuits.

In the dishwasher illustrated herein, the complete operating sequence includes the subcycles of prerinse, wash 1, wash 2, rinse 1, rinse 2, and dry. Each of the subcycles, except dry, includes the steps or functions of fill, circulate, pause and drain, during which the dishwasher chamber is filled with water, the water is circulated to perform the rinsing or washing operation for the articles such as plates and glassware being treated or washed in the dishwasher appliance, and the water is then drained. (In a washing machine, the term "agitate" is generally used rather than "circulate," with respect to the washing and rinsing subcycles. In a clothes dryer, the articles being treated in the dryer chamber may consist of articles of clothing, and the fluid for treating the articles usually comprises heated air for circulation or passage through the material undergoing the drying operation.) Flip-flops Z1, Z2 of the program circuit means 40 determine the repeated steps or functions while flip-flops Z3, Z4 and Z5 control the sequence of subcycles. The following tables relate the conditions of the flip-flops to the subcycles and steps being performed.

| Function | OPERATING CYCLE | | |
|---|---|---|---|
|  | Z3 | Z4 | Z5 |
| Prerinse | 0 | 0 | 0 |
| Wash 1 | 1 | 0 | 0 |
| Wash 2 | 0 | 1 | 0 |
| Rinse 1 | 1 | 1 | 0 |
| Rinse 2 | 0 | 0 | 1 |
| Dry | 1 | 0 | 1 |
| Function | REPEATED SUBCYCLE | | |
|  | Z1 | | Z2 |
| Fill | 0 | | 0 |
| Circulate | 1 | | 0 |
| Pause | 0 | | 1 |
| Drain | 1 | | 1 |

The power circuits 43 respond to control signals from the circuitry 42 to operate the various elements of the appliance. These include fill valve 16, motor 17 (which is bidirectional, one direction being for circulation and the other for drain), heater 25 and dispensers 22, 23 and 44 for the wash detergent and a water additive used in Z9A final rinse. Power circuitry 43 may, for example, utilize solid state gated bidirectional, current conducting semiconductor switching devices, mechanical relays, or the like.

The operating sequence will now be considered in detail. It will be assumed that manual control switches SW2 through SW5 are in the positions shown in the drawing. The cycle of operation is initiated by closure of SW1, a momentary contact switch, which applies a reset voltage V of proper logic level to the $P_K$ inputs of all flip-flops Z1–Z5. This sets all of the flip-flops to the 0 condition. As indicated in the tables above, a 0 condition for flip-flops Z3, Z4, Z5 identifies the prerinse subcycle, while a 0 condition for Z1, Z2 identifies the fill step. When the flip-flops Z1–Z5 are reset, a clock reset pulse is generated, initiating timing for the control.

The signals Z1, Z2 and Z9c (part of function timing 41) actuate NAND gate Z7a providing a fill signal at the output and through the inverter 46 to power circuit 43. This opens the fill valve 16 and allows water to enter the chamber of the dishwasher. If the level of water exceeds a predetermined point, water overfill limit switch 47 opens and the fill valve closes. The output from NAND gate Z7a also provides an input to OR gate Z9b and through it to NAND gate Z6B in the function timing portion of the control circuitry. The other input to Z6B is a 2 minute signal from clock 30. At the end of the two minute period, an inverted output from NAND gate Z6B to OR gate Z14A produces a clock reset pulse which resets the clock to zero time. The clock also generates a signal, identified as SYNC, which steps Z1 to the 1 condition. Z2 remains in the 0 position as there is a connection from the 1 out put of Z1 to both the J and K inputs thereof.

The second step of the repetitive subcycle, during which water is circulated through the washer, is initiated by the combination of Z1, Z2. These inputs actuate NAND gate Z6A providing a signal through inverter 48 to operate the motor 17 circulating the water in the washer. A signal from NAND gate Z6A is also coupled through inverter 49 to NAND gate Z8B which is actuated by a combination of Z6A, Z3, Z4, and in turn actuates OR gate Z9B indicating the rinse step and providing an input to function timing NAND gate Z6B. The output of Z6A is connected with OR gate Z16A to actuate heater 25. When the 2 minute signal is received, the output of Z6B again resets the clock and provides a SYNC pulse to the program circuit means 40. The synchronizing pulse, with Z1 in the 1 condition, resets Z1 to 0 and sets Z2 to 1. This condition establishes the pause step of the repetitive subcycle. The pause permits motor 17 to stop before reversing for the drain step. The length of the pause is determined by NAND gate Z7B, having Z1, Z2 and 4 second inputs. After the pause, the clock is again reset, producing a SYNC signal to Z1, Z2, switching both to the "set" or 1 position, the drain step of the subcycle. NAND gate Z7C, having inputs Z1, Z2 and 1 minute, establishes the length of the drain step. Motor 17 operates in the opposite direction from which it operated during circulation, pumping the water from the washer.

At the end of one minute, the clock is again reset and a SYNC pulse sent to the program circuit means 40. Both Z1 and Z2 are reset to the 0 condition and, if a 1 output is available from NAND gate Z14B (indicating that one or more of the inputs is 0), Z3 is actuated to the "set" or 1 condition. In the circuit illustrated in the drawing with turbidity switch SW2 in the off (0) position, NAND gate Z14B has a 0 input and, thus, has a 1 output. Accordingly, actuation of Z3 to 1 occurs.

Figure 5:
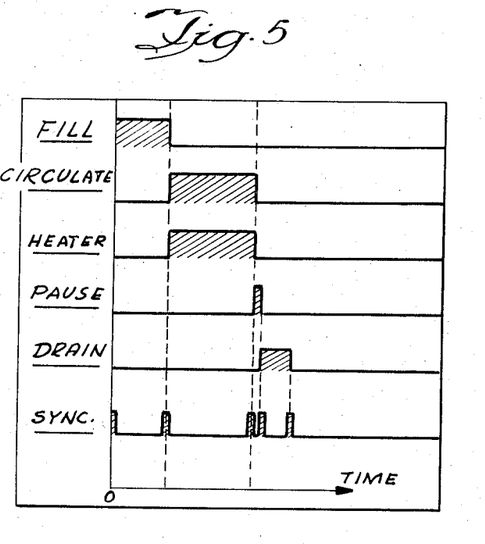
FIG. 5 is a timing diagram used in describing the operation of the control.

FIG. 5 illustrates the time relation of the signals controlling the various functions of the repeated subcycle. At the start of the cycle of operation, a sync pulse occurs setting Z1 and the clock is reset to zero. The condition for fill is establihsed, as described above. After the appropriate time for the fill operation (here, 2 minutes), a sync pulse occurs, motor 17 is energized to circulate the water and heater 25 is energized. At the end of this function of the subcycle (which may be either a rinse or a wash), another sync pulse actuates flip-flops Z1, Z2 and the clock is again reset. A short pause (3 seconds) occurs followed by a sync pulse and operation of motor 17 to drain the water from the apparatus. The initiation of the drain function is coordinated by another sync pulse. At the end of the drain function, a sync pulse occurs, resetting Z1, Z2 to zero and providing a clock signal to Z3, Z4, Z5.

Turbidity sensor 51 is a device which senses the amount of foreign matter in the prerinse water. It may, for example, be a lamp and photocell (not shown) associated with the drain from the housing. With switch SW2 connected to the turbidity sensor, if there is an excessive amount of dirt in the water, all inputs to Z14B are 1 and the output is 0. Upon completion of the drain step, the prerinse subcycle is repeated as Z3, Z4 and Z5 remain in the 0 condition.

Assuming the prerinse subcycle is complete, reset of Z2 to 0, plus the 1 output from Z14B sets Z3. Reference to the operating cycle table above will show that this corresponds with the first wash subcycle of the operating sequence. AS both Z1 and Z2 are reset to the 0 condition, the steps of fill, circulate, pause and drain described above are repeated. In addition, the following actions occur. At the start of the circulation step of the subcycle, with a condition of Z1, Z2, the output of NAND gate Z6A together with the conditions of Z3, Z4 actuate NAND gate Z8C to operate the first detergent dispenser 22. The output of NAND gate Z8C is also inverted and connected through OR gate Z6D, indicating wash, with the input of function timing NAND gate Z6C. The other input of NAND gate Z6C is a 4 minute signal from clock 30. As during the prerinse subcycle, motor 17 is operated to circulate water by the output of NAND gate Z6A and inverter 48. After the 4 minute wash step, the pause and drain steps are repeated, as described above.

On completeion of the drain function, when Z2 is reset to 0, Z3 is reset to 0, and Z4 is set to 1. This represents the second wash subcycle. The repetitive steps again start on completion of the fill step, with an output from Z6A, the conditions of Z3, Z4 actuate NAND gate Z9a energizing the second detergent dispenser 23. The inverted output of NAND gate Z9A, through OR gate Z6D, provides a wash input to cycle timer NAND gate Z6C. When the second four minute wash perior ends, the wash water is drained and program circuit means 40 is again actuated; at this time, Z14B has a 1 output (Z4 is 0) setting Z3 to the 1 condition.

Z3, Z4, Z5 establish the first rinse subcycle. Again the repetitive steps of the subcycle are controlled by Z1, Z2. Upon completion of the filling operation, with Z1 set, NAND gate Z8A has an output providing an input to timing NAND gate Z6B.

After the first rinse subcycle is complete, Z3 and Z4 are reset to 0 and Z5 is set through NAND gate Z10C and with the 0 output from Z2. This initiates the second rinse subcycle. The combination of Z3, Z4 and an inverted output from Z6A actuates NAND gate Z8B, and through OR gate Z9B provides an input to timing NAND gate Z6B. Washing additive dispenser 44 is actuated by the absence of a 0 output from flip-flop Z5. The repetitive subcycle is carried out as described above. After the second rinse is complete, Z1 and Z2 return to 0 condition and Z3 is set to 1. This set does not affect either Z4 or Z5 and they remain in the 0 and 1 conditions, respectively.

The drying subcycle is established by the combination of Z3, Z4, Z5. Heater 25 is energized by virtue of the Z9 input to OR gate Z16A. When the dry subcycle is completed, as indicated by closing of thermostat contacts 53, an output is developed by NAND gate Z9C again resetting the clock 30 and terminating the washer operation.

The operating cycle may be modified by actuation of the switches SW2–SW5. The function of turbidity sensor switch SW2 has been described above. If SW3 is placed in the "on" position, flip-flop Z4 is set to the 1 position at the start of the operating cycle. The prerinse and first wash are omitted. The operation starts with the second wash and continues as described above.

Double pole switch SW4 provides a rinse only operation by setting both Z3 and Z4 to the 1 position at the start. The first subcycle is the first rinse, described above. This is followed by the second rinse and dry subcycles.

If switch SW5 is closed, the thermostat 53 input is supplied to NAND gate Z9C and the drying operation is cancelled. A resistor 53a is connected from ground to the thermostat input line connecting to NAND gate Z9C to supply logic 0 when switch SW5 or thermostat 53 are open.

Figure 6:
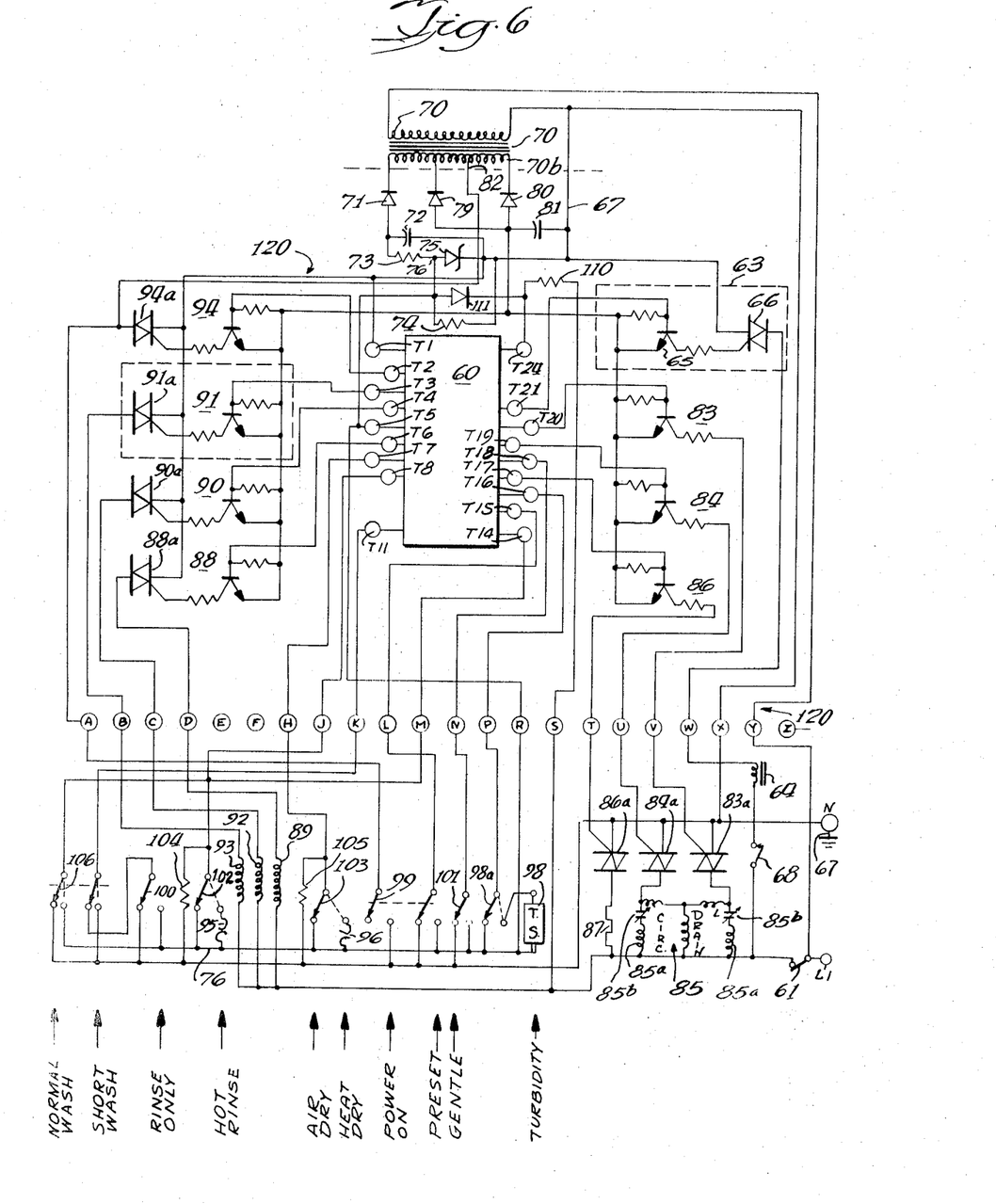
FIG. 6 is a schematic diagram of the circuitry of an appliance utilizing a control incorporating the invention.

FIG. 6 is illustrative of a dishwasher control having clock, program circuit means and gating circuits (which may be similar to those of FIG. 4 although some of the specific function capabilities are different), identified as control circuit block 60. The digital control circuitry of block 60 may, for example, advantageously be an integrated circuit utilizing metal oxide semiconductor (MOS) elements deposited on a single silicon chip. The various connections to control circuit 60 are made through numbered terminals. The power circuit for the dishwasher (as the circuit 43 in FIG. 4) which responds to signals from the control circuit to initiate and terminate the operating functions of the dishwasher and including the various operator and apparatus inputs together with their related circuits, is shown in detailed schematic form.

The discussion of the power circuits is based on certain assumptions regarding the operation of control circuit 60. The following cycle of operation will be assumed:

| Step No. | Function | Time | Selected Cycle |
|---|---|---|---|
| 1 | Fill | 2 Min. | Normal Wash Cycle |
| 2 | Rinse | 3 Min. | |
| 3 | Pause | 4 Sec. | |
| 4 | Drain | 1 Min. | |
| 5 | Fill | 2 Min. | |
| 6 | Wash (Detergent 1) | 3 Min. | |
| 7 | Pause | 4 Sec. | |
| 8 | Drain | 1 Min. | |
| 9 | Fill | 2 Min. | Short Wash Cycle — start |
| 10 | Rinse 1 | 3 Min. | |
| 11 | Pause | 4 Sec. | |
| 12 | Drain | 1 Min. | |
| 13 | Fill | 2 Min. | |
| 14 | Wash (Detergent 2) | 5 Min. | |
| 15 | Pause | 4 Sec. | |
| 16 | Drain | 1 Min. | |
| 17 | Fill | 2 Min. | Rinse Only Cycle — start |
| 18 | Rinse | 3 Min. | |
| 19 | Pause | 4 Sec. | |
| 20 | Drain | 1 Min. | |
| 21 | Fill (Wetting Agent) | 2 Min. | |
| 22 | Rinse | 3 Min. | or Thermostat |
| 23 | Pause | 4 Sec. | |
| 24 | Drain | 1 Min. | |
| 25 | Dry | 5 Min. | or Thermostat |
| 26 | End of Cycle | | |

The control circuit is energized from a suitable source as 60 $H_z$ AC connected with terminals N (ground) and L1. An interlock switch 61 is connected between power lead 62 and terminal L1. This interlock switch may be associated with the door or handle of the dishwasher, breaking the power circuit when the door is opened thereby interrupting the energization of the dishwasher components such as the pump motor, heater, solenoids, etc. Since the power supply for control circuit block 60 remains energized, and since there is no 60 $H_z$ input to the clock portion of circuit 60 via resistor 110 and control circuit terminal T24, the status of control circuit block 60 is maintained and when the dishwasher door is closed, connecting power lead 62 to terminal $L_1$ via interlock switch 61, the dishwasher program will resume starting from the portion of the program which was interrupted on opening of the door.

Several power switching circuits control the application of power to functional elements of the apparatus. The circuit enclosed in broken line box 63, which actuates the fill solenoid valve 64 is typical. A driver transistor 65 has its base connected with control circuit terminal T21 which provides a signal causing the transistor to conduct when the fill solenoid 64 is to be energized. Transistor 65 is connected with the gate terminal of a bi-directional current-conducting semi-conductor 66 commonly known as a Triac. Triacs, which are well known in the electronics art, normally exhibit a high impedance between their end terminals and exhibit a low impedance therebetween in response to the application of a signal, having an amplitude greater than a pre-determined magnitude, to their third or gate terminal. When transistor 65 conducts, it connects the gate of Triac 66 with a source of operating potential to be described below. This causes the Triac 66 to conduct, connecting the fill solenoid 64 from power line 62 to ground 67. Connected in series with fill solenoid 64 is an overfill limit switch 68 which opens if the dishwasher is overfilled to a predetermined level. Normally the actuation of fill solenoid 64 is timed by the duration of the signal from control 60. When the signal is not present, transistor 65 ceases conducting and the power circuit through Triac 66 is broken.

The power supply for the various control circuits includes a transformer 70 having a primary winding 70a connected across the power line. Two rectifier circuits are connected with secondary winding 70b. A half-wave rectifier diode 71 provides a negative operating potential for control circuit 60. Capacitor 72, shunted by series connected resistors 73, 74, and returned to ground 67, filters the output of the rectifier. Zener diode 75, connected in parallel with resistor 74, provides a regulated output voltage at 76 for the control circuit 60. Power input terminal T5 of circuit 60 is connected with the anode of zener diode 75 and terminal T1 is connected with ground 67.

A timing reference input for control circuit 60 is obtained from the 60$H_z$ power line through current limiting resistor 110 connected with control circuit terminal T24. Diode 111 is connected from terminal T24 to the power supply 76 clamping the negative half-cycle of the input signal to provide an essentially square wave drive for the timing circuit.

Diodes 79, 80 are connected in a full wave rectifier circuit, the output of which is filtered by capacitor 81. The circuit is completed through center tap 82 of the portion of transformer secondary winding 70b to which diodes 79, 80 are connected. The full wave rectifier circuit provides a negative operating potential for the transistor drivers and the Triac gates of the switching circuits which actuate the various elements of the apparatus. The connection of center tap 82 to ground 67, completing the rectifier circuit, includes switching means which initiate and terminate the operating cycle of the dishwasher, as will appear.

Before considering the operation of the circuit in detail, the other switching circuits and their functions will be identified.

Switching circuits 83 and 84, connected with terminals T20 and T19, respectively, of control circuit 60, operate Triacs 83a, 84a to control the operation of motor 85 in the drain and circulate modes. The motor 85 includes starting windings 85a which are switched out during run by opening relay contacts 85b.

Switching circuit 86, connected with terminal T17 of control circuit 60, operates Triac 86a to control energization of heater 87.

Switching circuit 88 operated from terminal T6 of the control circuit, actuates Triac 88a controlling solenoid 89 which dispenses wetting agent during the final rinse. Switching circuits 90 and 91, connected with control circuit terminals T4 and T3, actuate Triacs 90a, 91a to operate detergent dispensing solenoids 92 (first wash) and 93 (second wash).

Switching circuit 94, control circuit terminal T2, is a part of the cycle control for the full wave rectifier.

Various conditions of the dishwasher, either in its operation or as preset by the operator, provide inputs to control circuit 60 by connecting the control circuit terminals either with ground 67 (logic 0) or negative supply 76 (logic 1). Condition sensors include thermostats 95, 96 associated with the rinsing and drying sub-cycles, respectively, and turbidity sensor 98 which is connected with terminal T16 via switch 98a (see the position shown in broken line in FIG. 6) to effect repetition of the prerinse subcycle if that should be necessary. Switch 98a gives the operator the option to bypass turbidity sensor 98 if such an operation program should be desired. If the operator chooses not to use the turbidity sensor 98, the switch 98a is positioned as shown in solid line in FIG. 6 to connect Terminal T16 to negative supply 76 (logic 1).

The operator input switches serve a variety of functions and have been labeled in FIG. 6 to facilitate a better understanding of the invention. Switch 99 is a double-pole, double-throw momentary contact switch used to start the cycle of operation by connecting center-tap 82 to circuit terminal T1, and at the same time also connecting terminal T15 with power supply 76. Single-pole, double-throw switch 100 provides a "Rinse Only" operation by connecting terminal T11 with power supply 76. Single-pole, double-throw swtich 101, connected with control circuit terminal T18, limits the amount of water in the dishwasher by setting up an 80 second fill. The dishwasher is only partially filled and a "Gentle" or soft wash action results.

Switches 102 and 103 shunt thermostats 95 and 96 respectively, to provide the operator with the option of thermostat control over the rinse and dry cycles. When switches 102 and 103 are operated to the positions shown in solid line in FIG. 6, resistors 104 and 105 are connected from ground 67 to the thermostat input terminals T8 and T7 of the control circuit and supply logic 0 to control circuit 60, and the thermostats 95 and 96 are open. This cuts out the thermostat control over the rinse and dry cycles. If the operator desires thermostat control over the rinse and dry cycles, the switches 102 and 103 are operated to the positions shown in broken line in FIG. 6. Of course, thermostat control over either the rinse or the dry cycle can selectively be obtained by operation of either the switch 102, or the switch 102 to its position shown in broken line as indicated above.

Double-pole, double-throw switch 106 provides a "Normal Wash" when disposed as shown in FIG. 6. A "Short Wash" cycle is provided when switch 106 is operated to the position indicated in broken lines, thereby to connect power supply 76 to terminal T14.

The operator input switches described above thus serve a variety of functions, and facilitate selection of the most appropriate appliance program for a particular operation. Due to the digital logic implementation of the present invention, any one of a number of different cycles may be readily selected, together with the most suitable option of a number of applicable options (i.e., hot rinse, air dry, etc.), resulting in a very high degree of control flexibility not possible with home appliance controls of the prior art. In the illustrated embodiment, the operator may manipulate the proper input switch and thereby select any one of three cycles as follows: "Normal Wash Cycle;" "Short Wash Cycle;" or a "Rinse Only Cycle." These cycle designations are self-explanatory. After selecting the desired cycle, in the illustrated embodiment the operator may, in similar fashion, manipulate the appropriate input switch and thereby select the most appropriate one of a number of different cycle options as follows: "Gentle," in which the dishwasher is only partially filled with water and a gentle, soft wash action results; "Hot Rinse," instead of normal rinse; "Heat Dry," instead of air dry without use of heat; and "Turbidity," to utilize sensing by a turbidity sensor such as sensor 98 to determine the need for repetition of the prerinse subcycle. Thus, in the illustrated embodiment, the operator has a choice of 32 different appliance programs as follows:

1. Normal Wash Cycle
2. Normal Wash Cycle, Gentle
3. Normal Wash Cycle, Turbidity
4. Normal Wash Cycle, Hot Rinse
5. Normal Wash Cycle, Heat Dry
6. Normal Wash Cycle, Gentle, Turbidity
7. Normal Wash Cycle, Gentle, Hot Rinse
8. Normal Wash Cycle, Gentle, Heat Dry
9. Normal Wash Cycle, Gentle, Turbidity, Hot Rinse
10. Normal Wash Cycle, Gentle, Turbidity, Heat Dry
11. Normal Wash Cycle, Gentle, Turbidity, Hot Rinse, Heat Dry
12. Normal Wash Cycle, Turbidity, Hot Rinse
13. Normal Wash Cycle, Turbidity, Heat Dry
14. Normal Wash Cycle, Turbidity, Hot Rinse, Heat Dry
15. Normal Wash Cycle, Hot Rinse, Heat Dry
16. Normal Wash Cycle, Gentle, Hot Rinse, Heat Dry
17. Short Wash Cycle
18. Short Wash Cycle, Gentle
19. Short Wash Cycle, Hot Rinse
20. Short Wash Cycle, Heat Dry
21. Short Wash Cycle, Gentle, Hot Rinse
22. Short Wash Cycle, Gentle, Heat Dry
23. Short Wash Cycle, Hot Rinse, Heat Dry
24. Short Wash Cycle, Gentle, Hot Rinse, Heat Dry
25. Rinse Only Cycle
26. Rinse Only Cycle, Gentle
27. Rinse Only Cycle, Hot Rinse
28. Rinse Only Cycle, Heat Dry
29. Rinse Only Cycle, Gentle, Hot Rinse
30. Rinse Only Cycle, Gentle, Heat Dry
31. Rinse Only Cycle, Hot Rinse, Heat Dry
32. Rinse Only Cycle, Gentle, Hot Rinse, Heat Dry After selection of the desired cycle, and cycle option as described above, a program of operation is initiated by actuation of switch 99 by the operator. This grounds the center tap 82 of the full wave rectifier portion of the power supply, providing an operating potential for the transistor drivers of the various switching circuits. A logic 1 is applied to terminal T15 of control circuit 60, starting the cycle of operation. The transistor driver of switching circuit 94, connected wtih terminal T2 of the control circuit 60, is turned on causing the Triac 94a to conduct, completing the power supply circuit in parallel with switch 99. Switching circuit 94 continues to conduct until the end of the operating cycle.

At the end of the operating cycle, the output at terminal T2 of the control circuit 60 terminates and switching circuit 94 ceases to conduct. This interrupts the center tap connection 82 of the power supply for the various switching devices and stops operation of the dishwasher.

Major portions of the circuitry of FIG. 6 may advantageously be mounted on a printed circuit board for improved reliability, economy, ease of manufacture, and ease of maintenance. In the embodiment of the invention illustrated in FIG. 6, the portion of the circuitry shown above the broken horizontal line drawn through the series of lettered terminals A, B, C, etc. and identified with reference numeral 120 is mounted on a printed circuit board. Thus, the printed circuit board embodying the portion of the circuitry of the present invention identified with reference numeral 120 can be unplugged and readily removed from the appliance for circuit testing or exchange in the event of a malfunction.

A further important advantage of the present invention is that a circuit embodying the invention can be checked out very rapidly utilizing a relatively high frequency source for the timing countdown, in place of the 60 $H_z$ line frequency base for the disclosed countdown system, since the length of the timed portion of the operating cycle is inversely proportional to the frequency of the time base.

Figure 7:
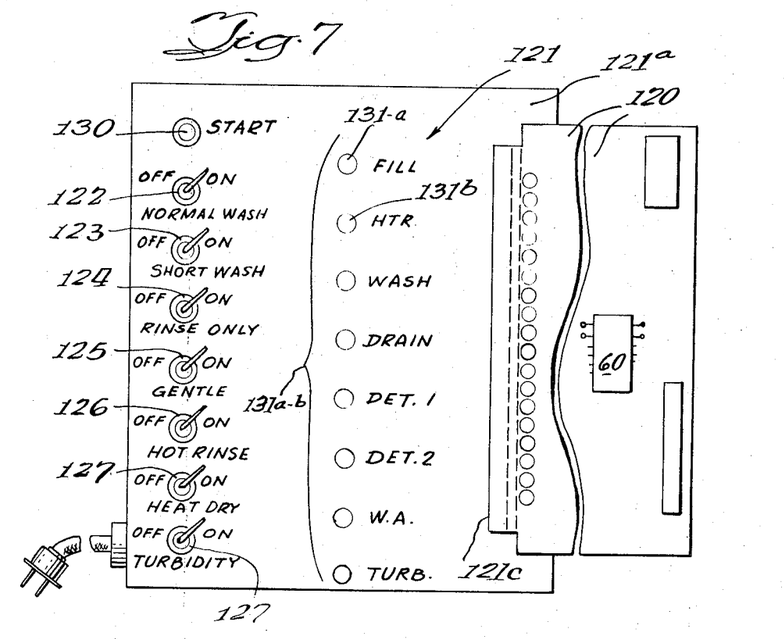
FIG. 7 is a front view of an apparatus for testing a control incorporating the invention.

In FIG. 7, there is shown a test apparatus 121 comprising, in one form, a box-like housing 121a for mounting the circuit components of apparatus 121 for quickly checking out the control of the present invention. A series of toggle switches, 122 through 128, can be selectively operated to "On" or "Off" positions to establish the desired cycle, and cycle options, and thereby simulate any of the dishwasher appliance programs referred to above. The test apparatus 121, in one form which has provided satisfactory results, incorporates a relatively high frequency source comprising a 4 $KH_z$ multivibrator (not shown) to generate the timing countdown base instead of the 60 $H_z$ line frequency base thereby to speed checking of the circuit.

The test apparatus 121 includes a start switch 130, and a series of light bulbs 131a, 131b, etc., each corresponding to one of the components of the appliance circuit including the fill solenoid, the heater, etc., all as shown in FIG. 6. A plug 121b is provided for energizing apparatus 121 via a conventional 60 Hz., 120 volt AC source. An elongated receptacle 121c, provided with terminals to cooperate with printed circuit board terminals A, B, C, etc., is mounted on one side of housing 121a to receive the A, B, C, etc. terminal edge of the printed circuit board 120 in plug-in fashion. It will be appreciated that the apparatus 121 also includes in its circuit certain elements such as resistors, etc. (not shown) to provide the desired display for the checking of the circuitry 120 undergoing a checking operation as shown in FIG. 7. After the operator selects the desired cycle and cycle options via switches 122–128 and then presses start button 130, the control is enabled to proceed through the selected program at an accelerated rate with lighting of the bulbs 131a, 131b, etc. in a sequence simulating the energization and deenergization of the appliance components corresponding to the selected program or operating cycle. This provides a very fast and accurate means for checking out the circuit. The illustrated version permits in-field checkout of the control of the invention in less than 1 minute, which is a rate over 50 times faster than the rate of normal operation of the apparatus through a complete operating cycle. Thus, the present invention provides a fast and easy means for checking out an appliance control circuit, not possible with conventional control means.

The foregoing disclosure of specific embodiments is illustrative of the broad inventive concepts comprehended by the invention.

The embodiments of the invention in which an exclusive property or privelege is claimed are defined as follows:

1. An electronic control for a washing appliance including a chamber for holding articles to be treated, means for admitting a fluid into the chamber, and means for circulating the fluid within the chamber, comprising:
   means including a plurality of flip-flop stages responsive to an alternating reference signal for generating timing signals to establish a timing period;
   means for sensing a condition in the apparatus;
   means responsive to said sensing means for generating a signal to initiate a timing period; and
   means responsive to a timing signal to terminate operation of the appliance.

2. An electronic control including solid state devices and for a cyclically operated washing apparatus including a liquid chamber for holding articles to be washed, means for admitting liquid into the chamber, means for draining liquid from the chamber, and means for circulating the liquid within the chamber, such control comprising:
   means for generating timing signals;
   program circuit means having means to receive input signals, means to provide output signals, and a plurality of sequential stable states representing the functions of the apparatus, said program circuit means including a plurality of serially connected bistable flip-flop circuits;
   gate circuit means responsive to an output signal provided by said program circuit means, and to said timing signals, for generating signals to initiate and terminate said functions; and
   means responsive to termination of each function of the apparatus for actuating said program circuit means from one stable state to the next.

3. An electronic control for a cyclically operated washing appliance including a chamber for holding articles to be treated, means for admitting a fluid into the chamber, and means for circulating the fluid within the chamber, such control comprising:
   means including a plurality of flip-flop stages responsive to an alternating reference signal for generating timing signals;
   program circuit means having means to receive input signals, means to provide output signals, and a plurality of sequential stable states representing the functions of the apparatus, said program circuit means comprising a memory including a plurality of serially connected bistable flip-flop circuits; and
   gate circuit means responsive to an output signal provided by said program circuit means, and to said timing signals, for generating signals to initiate and terminate said functions.

4. An electronic control for a cyclically operated home washing appliance including a chamber for holding articles to be treated, means for admitting a fluid into the chamber, and means for circulating the fluid within the chamber, such control comprising: means responsive to a first electrical input providing a preselected series of electrical impulses for effecting a series of preselected control operations corresponding to operations of the washing appliance; means responsive to the arrangement of said input responsive means for displaying the respective effecting of said control operations as an indication of the corresponding operation of the washing appliance; and means for providing a second electrical input providing said preselected series of electrical impulses at a rate substantially greater than that of said first electrical input for providing expedited testing of the control apparatus.

5. The electronic control apparatus of claim 4 where said second electrical input has a rate over 50 times greater than the rate of said first electrical input.

6. In a home appliance having means for performing an operating cycle comprising a plurality of sequential functions which are initiated and terminated in accordance with one or the other of time or conditions of the apparatus, a control comprising:
   a source of timing signals;
   means for sensing conditions in the apparatus;
   program circuit means having a plurality of sequential stable states representing the functions of the apparatus;
   gate circuit means responsive to said program circuit means, to said timing signals, and to said means for sensing conditions of the apparatus for generating signals to initiate and terminate said functions; and
   means responsive to termination of each function of the apparatus for actuating said program circuit means from one stable state to the next, one of the functions of the operating cycle of the control including the control of a flow of fluid, said appliance having a flow control valve, and said gate circuit means including means for actuating said flow control valve to control said fluid flow.

7. The structure of claim 6 in which said appliance utilizes water in the operation thereof and has a receptacle in which water is received during performance of the operating cycle, said condition sensing means including means for sensing the level of water in said receptacle to provide an input for said gate circuit means.

8. In a home appliance having a flow control valve means for performing an operating cycle comprising a plurality of sequential functions which are initiated and terminated in accordance with one or the other of time or conditions of the appliance, an electronic control comprising:

clock means having a synchronizing pulse output and plural output timing signals representing different discrete time intervals;

means for sensing conditions of the appliance;

program circuit means defined by a plurality of different sets of binary control means, the binary control means of said different sets cooperating to provide program signals representing the functions of the appliance;

gate circuit means responsive to said program signals, to said timing signals, and to said means for sensing conditions of the appliance for generating signals to control said flow control valve; and means responsive to termination of each function of the appliance for actuating said program circuit means from one arrangement thereof wherein said flow control valve is closed to a next arrangement wherein said flow control valve is open.

9. The structure of claim 8 in which said appliance utilizes water in the operation thereof and has a receptacle in which water is received during performance of the operating cycle, said condition sensing means including means for sensing the level of water in said receptacle to provide an input for said gate circuit means.

10. In a home appliance having a flow control valve means for performing an operating cycle comprising a plurality of sequential functions which are initiated and terminated in accordance with one or the other of time or conditions of the appliance, an electronic control comprising:

clock means having a synchronizing pulse output and plural output timing signals representing different discrete time intervals;

means for sensing conditions of the appliance;

program circuit means defined by a plurality of different sets of binary control means, the binary control means of said different sets cooperating to provide program signals representing the functions of the appliance;

gate circuit means responsive to said program signals, to said timing signals, and to said means for sensing conditions of the appliance for generating signals to control said flow control valve;

means responsive to termination of each function of the appliance for actuating said program circuit means from one arrangement thereof to a next arrangement; and means for speeding up the provision of said pulse output to speed up the provision of said program signals for providing expedited testing of the electronic control.

11. The structure of claim 10 wherein said last named means provides said pulse output at a rate over 50 times faster than that provided by said clock means.

* * * * *